(12) United States Patent
Harper

(10) Patent No.: US 8,112,300 B2
(45) Date of Patent: Feb. 7, 2012

(54) PRODUCTION OPTIMIZER FOR SUPPLY CHAIN MANAGEMENT

(75) Inventor: Charles N. Harper, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 1364 days.

(21) Appl. No.: 11/279,557

(22) Filed: Apr. 12, 2006

(65) Prior Publication Data

US 2006/0241986 A1    Oct. 26, 2006

Related U.S. Application Data

(60) Provisional application No. 60/674,240, filed on Apr. 22, 2005.

(51) Int. Cl.
*G06Q 10/00* (2006.01)
(52) U.S. Cl. ........................... 705/7.26; 705/7.12
(58) Field of Classification Search ............ 705/7.12, 705/7.26
See application file for complete search history.

(56) References Cited

U.S. PATENT DOCUMENTS

| | | | |
|---|---|---|---|
| 3,974,481 A | | 8/1976 | Ledieu et al. |
| 4,958,292 A | * | 9/1990 | Kaneko et al. ............. 700/106 |
| 5,155,679 A | * | 10/1992 | Jain et al. .................. 700/106 |
| 5,327,340 A | * | 7/1994 | Kaneko et al. ............. 700/101 |
| 5,761,381 A | * | 6/1998 | Arci et al. .................. 706/13 |
| 5,841,659 A | * | 11/1998 | Tanaka et al. ............. 700/121 |
| 6,198,980 B1 | * | 3/2001 | Costanza .................... 700/99 |
| 6,434,443 B1 | * | 8/2002 | Lin ............................ 700/100 |
| 6,546,300 B1 | * | 4/2003 | Fukuda et al. ............. 700/100 |
| 6,795,742 B1 | * | 9/2004 | Ichikawa .................... 700/97 |
| 7,072,723 B2 | * | 7/2006 | Kohn et al. ................. 700/28 |
| 7,117,164 B2 | * | 10/2006 | Slocum ...................... 705/10 |
| 7,636,670 B2 | * | 12/2009 | Woehler ..................... 705/7 |
| 7,672,862 B1 | * | 3/2010 | Venkatasubramanyan et al. ........................ 705/8 |
| 2002/0156663 A1 | * | 10/2002 | Weber et al. .............. 705/7 |
| 2003/0084011 A1 | * | 5/2003 | Shetty ....................... 706/13 |
| 2003/0195794 A1 | * | 10/2003 | Yasuda ...................... 705/10 |
| 2003/0202479 A1 | * | 10/2003 | Huang et al. .............. 370/252 |

OTHER PUBLICATIONS

Dorigo, Marco.; Maniezzo, Vittorio; Colorni, Alberto. "The Ant System: Optimization by a Colony of Cooperating Agents". 1996. IEEE Transactions on Systems, Man and Cybernetics, Part B, vol. 26, Issue 1, pp. 1-13.*
Routroy, Srikanta; Kodali, Rambabu. "Differential Evolution Algorithm for Supply Chain Inventory Planning". Jan. 2005. Journal of Manufacturing Technology Management. vol. 16, Issue 1.*
Bell, John E.; McMullen, Patrick R.; "Ant Colony Optimization Techniques for the Vehicle Routing Problem". 2004. Advanced Engineering Informatics. vol. 18, pp. 41-48.*
Bullnheimer, Bernd; Kotsis, Gabrieke; Strauss, Christine; "Parallelization Strategies for the Ant System". 1998.*
Fieldsend, Jonathan E.; "Multi-Objective Particle Swarm Optimisation Methods". Mar. 1, 2004.*

(Continued)

*Primary Examiner* — Peter Choi
(74) *Attorney, Agent, or Firm* — Elwood L. Haynes

(57) ABSTRACT

One embodiment of the invention provides a method for optimizing a supply chain management (SCM) problem. A genetic algorithm optimization technique may be used to generate a production solution for the production side of an SCM problem and an ant colony optimization technique may be used to generate a solution for the distribution side of the SCM problem. Together, the genetic algorithm optimization technique and the ant colony optimization technique operate to quickly identify high-quality solutions to an SCM problem.

27 Claims, 8 Drawing Sheets

OTHER PUBLICATIONS

Bullnheimer, Bernd; Hartl, Richard F.; Strauss, Christine. "An Improved Ant System Algorithm for the Vehicle Routing Problem". 1999. Annals of Operations Research. vol. 89. pp. 319-328.*

Chitty, Darren M.; Hernandez, Marcel L. "Hybrid Ant Colony Optimisation Technique for Dynamic Vehicle Routing". 2004. GECCO 2004, LNCS 3102. pp. 48-59.*

Dias, Alexandre H. F.; de Vasconcelos, Joao A. "Multiobjective Genetic Algorithms Applied to Solve Optimization Problems". Mar. 2002. IEEE Transactions on Magnetics. vol. 38, Issue 2.*

Fonseca, Carlos M.; Fleming, Peter J.; "Genetic Algorithms for Multiobjective Optimization: Formulation, Discussion and Generalization". Jul. 1993. Genetic Algorithms: Proceedings of the Fifth International Conference.*

Schaffer, James David. "Some Experiments in Machine Learning Using Vector Evaluated Genetic Algorithms". 1984. Vanderbilt University.*

Cordeau, J-F.; Gendreau, M.; Laporte, G.; Potvin, J-Y; Semet, F. "A Guide to Vehicle Routing Heuristics". May 2002. The Journal of the Operational Research Society. vol. 53, Issue 5. pp. 512-522.*

Geiger, M. J.; "Genetic Algorithms for Multiple Objective Vehicle Routing". Jul. 16-20, 2001. MIC'2001—4th Metaheuristics International Conference.*

Hu, Xiaohui; Eberhart, Russell C.; Shi, Yuhui. "Particle Swarm with Extended Memory for Multiobjective Optimization". 2003. IEEE.*

Silva, Carlos A.; Runkler, Thomas A.; Sousa, Joao M.; Sa da Costa, J. M. "Optimization of Logistic Processes in Supply-Chains Using Meta-heuristics". 2003. EPIA 2003, LNAI 2902. pp. 9-23.*

Doerner, Karl; Gutjahr, Walter J. "Pareto Ant Colony Optimization: A Metaheuristic Approach to Multiobjective Portfolio Selection". 2004. Annals of Operations Research. Issue 131. pp. 79-99.*

Dorigo, Marco. Di Caro, Gianni. "Ant Algorithms for Discrete Optimization". 1999. Artificial Life. MIT Press.*

Dorigo, Marco. Di Caro, Gianni. "The Ant Colony Optimization Meta-Heuristic". 1999. McGraw-Hill Ltd. pp. 11-32.*

Doerner, Karl; Gronalt, Manfred; Hartl, Richard F.; Reimann, Marc; Strauss, Christine; Stummer, Michael. "SavingsAnts for the Vehicle Routing Problem". Dec. 2001.*

Sheu, Jiuh-Biing. "Locating Manufacturing and Distribution Centers: An Integrated Supply Chain-Based Spatial Interaction Approach". 2003. Transportation Research Part E 39. pp. 381-397.*

Benjaafar, Saifallah; Gupta, Diwakar. "Workload Allocation in Multi-Product, Multi-Facility Production Systems with Setup Times". 1999. IIE Transactions. vol. 31. pp. 339-352.*

Lee, Heungsoon Felix; Srinivasan, Mandyam M.; Yano, Candace Arai. "The Optimal Configuration and Workload Allocation Problem in Flexible Manufacturing Systems". 1991. International Journal of Flexibile Manufacturing Systems. Issue 3. pp. 213-230.*

Oliff, Michael D.; Burch, E. Earl. "Multiproduct Production Scheduling at Owens-Corning Fiberglas". Sep.-Oct. 1985. Interfaces. pp. 25-34.*

Tallon, William J.; "A Comparative Analysis of Master Production Scheduling Techniques for Assemble-To-Order Products". Summer 1989. Decision Sciences. vol. 20, Issue 3. pp. 492-506.*

Inman, Robert R.; Jordan, William C.; "Integrated Assembly Line Loading, Design, and Labor Planning". 1997. Journal of Manufacturing Systems. vol. 16, Issue 5. pp. 315-322.*

Coleman, B. Jay; Vaghefi, M. Reza. "Heijunka (?): A Key to the Toyota Production System". Fourth Quarter 1994. Production and Inventory Management Journal. vol. 35, Issue 4. pp. 31-35.*

Ding, Fong-Yuen; Tolani, Ravi.; "Production Planning to Support Mixed-Model Assembly". 2003. Computers & Industrial Engineering. Issue 45. pp. 375-392.*

Katayama, Hiroshi. "On a Two-Stage Hierarchical Production Planning System for Process Industries". 1996. International Journal of Production Economics. Issue 44. pp. 63-72.*

Ip, W. H.; Li, Y.; Man, K. F.; Tang, K. S.; "Multi-Product Planning and Scheduling Using Genetic Algorithm Approach". 2000. Computers & Industrial Engineering. Issue 38. pp. 283-296.*

Benjaafar, Saif; El-Hafsi, Mohsen; de Vericourt, Francis. "Demand Allocation in Multiple-Product, Multiple-Facility, Make-to-Stock System". Oct. 2004. Management Science. vol. 50, Issue 10. pp. 1431-1448.*

David Davis, "Using an Ant System and a Genetic Algorithm to Schedule Production and Delivery of Liquid Oxygen and Liquid Nitrogen to 10,000 Client Sites," Proceedings of GECCO/ECI'04; published in 2004.

European Communication Pursuant to Article 94(3) for EP06744510.6, dated Apr. 9, 2009.

Davis, L.D., "Using an Ant System and a Genetic Algorithm to Schedule Production and Delivery of Liquid Oxygen and Liquid Nitrogen to 10,000 Client Sites," Gecco Session (ECI), Jun. 26, 2004, pp. 1-5, Retrieved from Internet: URL: http://www.cs.bham.ac.uk/~wbl/biblio/gecco2004/prof2.html.

Section "NuTech Solutions to Speak at the Gecco Conference," p. 4, Nutech Solutions Newsletter, vol. 1, No. 1, Jun. 2004, pp. 1-5, Retrieved from Internet: URL:http://www.nutechsolutions.com/newsletter/june04.pdf.

Naso, D., et al., "Genetic Algorithms in Supply Chain Scheduling of Ready-Mixed Concrete," Report Series research in Management, ERIM Research Program: "Business Processes, Logistics and Information Systems," Oct. 2004, pp. 1-52, Retrieved from the Internet: URL: http://repub.eur.nl/publications/eco_man/jel/m/index/209731320/.

Gambardella, L.M., et al., "Chapter 5: MACS-VRPTW: A Multiple Ant Colony System for Vehicle Routing Problems with Time Windows," Technical Report IDSIA, vol. 06-99, Mar. 1, 1999, pp. 1-17, Retrieved from Internet: URL:http://www.idsia.ch/idsiareport/IDSIA-06-99.ps.gz.

Silva, C.A., et al., "A Multi-Agent Approach for Supply Chain Management Using Ant Colony Optimization," Intn'l Conference on Systems, Man and Cybernetics, vol. 2, Oct. 10, 2010, pp. 1938-1943, Retrieved from Internet: URL: http://dx.doi.org/10.1109/ICSMC.2004.1399970.

Choi, H.R., et al., "Multi-Agent Based Integration Scheduling system Under Supply Chain Management Environment," Lecture Notes in Computer Science, Session 3B: intelligent Systems (1) vol. 3029, Apr. 22, 2004, pp. 249-263, Retrieved from Internet: URL: http://dx.doi.org/10.1007/b97304.

Lee, Z.J., "A Hybrid Algorithm Applied to Traveling Salesman Problem," IEEE Intn'l Conference on Networking, Sensing and Control, Vo. 1, Mar. 21, 2004, pp. 237-242, Retrieved from Internet: URL: http://dx.doi.org/10.1109/ICNSC.2004.1297441.

PCT/IB2006/000910, International Search Report, Sep. 7, 2007, 5 pgs.

Examination Report for Canadian Patent Application Serial No. 2,606,133 (S7065CA/160-46/CJL) dated Dec. 10, 2009.

Office Action for Chinese Patent Application Serial No. 2006800225634 (S7065CN) dated Apr. 1, 2010.

Written Opinion for PCT Patent Application Serial No. PCT/IB2006/000910 (S7065 PCT) dated Oct. 22, 2007.

Office Action for Russian Patent Application Serial No. 2007143321 (S7065RU (2412-147074RU/3008)) dated Apr. 5, 2010.

* cited by examiner

700

800

PRODUCTION OPTIMIZER FOR SUPPLY CHAIN MANAGEMENT

CROSS-REFERENCE TO RELATED APPLICATIONS

This application claims the benefit under 35 U.S.C. §119 (e) to provisional application No. 60/674,240, filed Apr. 22, 2005, the entire contents of which are incorporated herein by reference.

BACKGROUND

Optimizing a supply chain problem is a complex task. Generally, supply chain management refers to the flow of products from a production site through intermediate locations to the site of final use. In simple terms, a supply chain management (SCM) problem may be described as follows: products may be produced (or obtained) from a variety of sources for a variety of costs, while at the same time, product must be distrusted to a variety of customers. Note that this is different from a traditional delivery optimization problem. In the delivery optimization scenario, a specific product must be delivered from an origin to a destination, and the essential problem is how to deliver a set of products most efficiently. An SCM problem may be substantially complicated, however, when the product in question is a commodity product, such as industrial liquids. In this case, the commodity product delivered to any given destination may be produced (or obtained) from any available source. Because of this, adding a production side to an SCM problem substantially complicates the optimization process.

Currently, optimization systems are available to optimize the distribution side of an SCM problem. These systems typically identify a set of delivery routes for a set of deliveries from specified locations. Such systems are often constrained, however, by an inability to account for different production possibilities. At the same time, at least for the producer and distributor of commodity materials, energy costs often vary widely from location to location, different plants have different cost and production profiles, and clients' rates of usage of the commodity product may vary. Thus, selecting a production strategy may have a significant impact on operational costs. In fact, for the production and distribution of industrial liquids, the largest cost component of production and distribution may be the cost of power used by production plants. In such a case, a system configured to optimize the distribution of products may produce results that are far from optimal. This occurs as it is often favorable to produce materials at a production plant with very low production costs, even where this may significantly increase transportation costs for some deliveries. Current optimization systems, however, often fail to account for these scenarios.

Accordingly, there remains a need for optimization techniques that are able to optimize both the production side and distribution side of an SCM problem for the producer and distributor of a commodity product.

SUMMARY

Various embodiments of the present invention relate to both the production side and distribution side of a supply chain management problem. For example, embodiments of the invention may be used to optimize both the production and distribution of commodity materials such as industrial liquids.

One embodiment of the invention includes a method of optimizing a supply chain. The method generally includes generating an optimized production solution for the supply chain by using a genetic algorithm optimization technique to optimize a population of seed solutions, and generating an optimized distribution solution for the optimized production solution using an ant colony optimization technique. Together, the genetic algorithm optimization technique and the ant colony optimization technique may operate to quickly identify high-quality solutions to an SCM problem.

In a particular embodiment, generating an optimized production solution for the supply chain may include reading input data, wherein the input data describes a supply chain problem to be optimized; generating a population of solutions, wherein each solution in the population specifies a feasible solution for a supply chain problem to be optimized; evaluating each solution in the population and sorting the solutions in the population according to the evaluation, and performing the genetic algorithm optimization technique using the population until a termination condition specified by the input data is satisfied.

In general, the genetic algorithm optimization technique may be configured to "evolve" the initial population through many generations, generating new solutions and removing poor ones from the population along the say. New solutions are typically generated using by altering a solution using a selected modification technique. Any number of solution modification techniques may be used. For example, one solution modification technique includes randomly modifying a solution in the population, another technique includes modifying a solution based on a heuristic rule, and a third technique includes cross-breeding two or more solutions. Additionally, because the SCM problem to be optimized may reflect a real-world operation, the input data may come from a system status database describing the current real-world operation of a production and distribution operation. Further, the input data may be provided in a structured form, such as the widely used extensible markup language (XML) used for describing data.

The initial population of solutions may be generated in a variety of ways. For example, the population of seed solutions may include a first group of solutions generated according to heuristic rules and a second group of solutions generated using a random process.

Additionally, in another particular embodiment, generating the optimized distribution solution for the optimized production solution using the ant colony optimization technique may include initializing a plant weight vector for each production plant in the supply chain; initializing an installation vector for each delivery location in the supply chain; and generating the distribution solution, wherein the distribution solution describes one or more delivery routes from a production plant to at least one delivery location.

In general, components of the plant weight vector may indicate preferences for a delivery from the plant represented by the vector to a collection of installations. And components of an installation vector may indicate a preference for a delivery route from the installation represented by the installation vector to other installations.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Embodiments of the invention provide a computerized optimization system that may be used to optimize the production and distribution of commodity materials. As used herein a supply chain optimization (SCM) problem is used to refer to the optimization of both the production and distribution of commodity materials. For example, embodiments of the invention may be used to optimize the production and distribution of industrial liquids such as liquid nitrogen, liquid oxygen, liquid argon, etc.

Generally, the term "optimization" is used herein to describe a solution to an SCM problem that is superior to other solutions, usually in terms of production costs, distribution costs, and/or other factors. A solution to an SCM problem refers to a description of a production and/or distribution schedule. An ideal solution will satisfy any operational constraints (e.g., production limits and customer requirements), while also minimizing the overall cost of production and distribution. Note, however, embodiments of the present invention are not required to determine a truly optimal, or best, solution to an SCM problem. Instead, the term optimization generally refers to identifying acceptable solutions to difficult problems in a reasonable amount of time. In one embodiment, the optimization system includes a software application configured to search for a high-quality solution to an optimization problem.

In the case of the production and distribution of commodity products, the optimization system may be configured to identify plant production levels and route schedules that satisfy customer demands, while also reducing operating costs. For example, optimizations that may be identified include: the reduction of power costs by shifting production among different plants, identifying a source of production and delivery route to use for each required delivery, and identifying a quantify of a commodity product to deliver at each stop along a delivery route, in order to meet obligations to customers.

Embodiments of the invention are described herein relative to a production and distribution system used to produce and distribute both liquid (LOX or $O_2$) and liquid nitrogen (LIN or $N_2$). However, one of ordinary skill in the art will recognize that embodiments of the present invention may be adapted to optimizing the production and distribution of a variety of commodity products, including optimizing the production and distribution of more (or fewer) than two materials, including materials other than $O_2$ or $N_2$.

Figure 1:
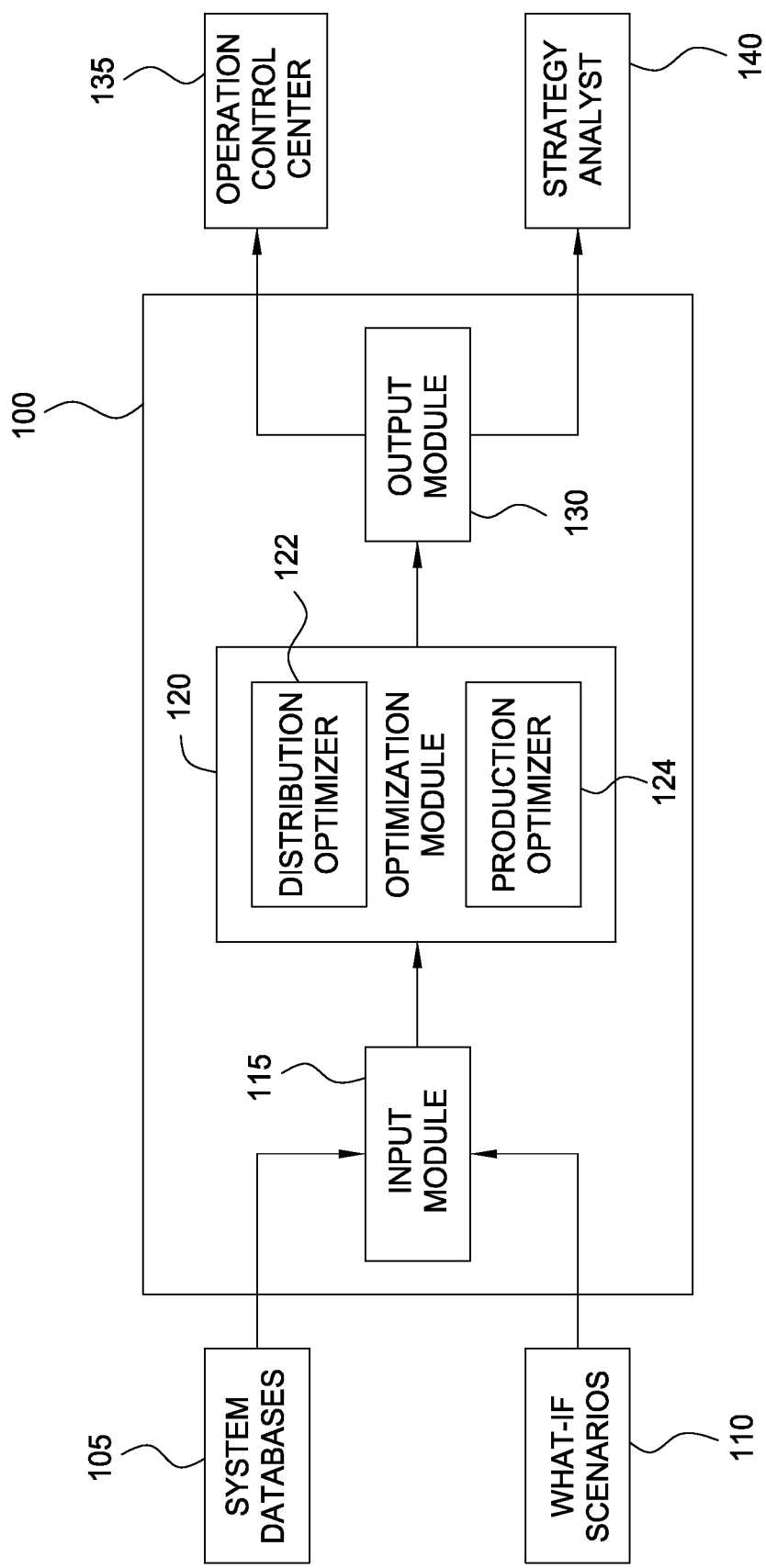
FIG. 1 illustrates a supply chain optimization system, according to one embodiment of the invention.

FIG. 1 illustrates a supply chain optimization system 100, according to one embodiment of the invention. Generally, the components illustrated in system 100 may be implemented as computer software applications configured for existing computer systems, e.g., desktop computers, server computers, laptop computers, tablet computers, and the like. The applications described herein, however, are not limited to any particular computing system and may be adapted to take advantage of new computing systems as they become available. Further, the system 100 may be adapted for use in multi-processing environments such as a system with multiple CPUs and with distributed and parallel systems such as computing clusters or grids.

Additionally, the software applications illustrated in system 100 may be executing on distributed systems communicating over computer networks including local area networks or large, wide area networks such as the Internet. In one embodiment, components of system 100 may be provided as an application program (or programs) stored on computer readable media such as a CD-ROM, DVD-ROM, flash memory module, or other tangible storage media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

As shown, system 100 includes input module 115, optimization module 120, and output module 130. Input module 115 may be configured to receive and process data describing a production and distribution system to be optimized (i.e., describing an SCM problem). In one embodiment, input module 115 may be configured to read and process extensible markup language (XML) documents. XML is a widely used standard for creating markup languages used to describe the structure of data. XML allows users to define a set of markup tags and document structure. Additionally, a wide variety of XML document viewers, editors, and utilities are commercially available.

In one embodiment, input modules 115 module may generate a set of a set of input files describing a production and distribution scenario to be optimized. For example, system databases 105 may store information regarding the current state of a production and distribution operation such as information related to production facilities, production levels, forecast demand, current production costs, client sites, client requirements, distribution facilities, and distribution costs, etc. From this information, input modules 115 may be configured to generate a set of input files describing the current state of operations using data retrieved from system databases 105, along with user-provided settings for an evaluation module (used to evaluate solutions), and user configurations of the optimization module 120. Additonally, input modules 115 may also be used to process "what if" scenarios 110 that describe possible production and distribution scenarios.

For example, users may create a what-if scenario 110 to study of the benefits obtainable by upgrading equipment, to study of the costs of adding a new customer, or to study of the benefits of adding or removing production facilities. In such a case, a user may edit a set of input files generated from system databases to modify aspects of the current state of a production and distribution operation. Note however, the optimization system 100 and input modules 115 need not distinguish between an optimization problem defined using information from system database 105 and an optimization problem defined by a what if scenario 110 created by a user.

As shown, optimization module 120 includes both a distribution optimizer 122 and a production optimizer 124. The distribution optimizer may be configured to identify low-cost settings for the production facilities that satisfy operational constraints while minimizing operational costs. And the production optimizer may be configured to identify effective distribution strategies. By including both optimization modules in a single optimization system 100, the production optimization may be performed in view of the distribution costs and constraints, and vice versa. In one embodiment, the optimization module may be configured to provide a production and distribution schedule for an upcoming time period. In a typical case, the optimization module 120 may provide a production and distraction schedule for a week long period. However, the actual time period may be specified as part of a set of input files provided to input module 115.

Moreover, although distribution optimizer 122 and production optimizer 124 may operate in conjunction with one another, each may be configured to use different optimization methods. This allows optimization modules 122 and 124 to operate using the most appropriate technique for the problem being optimized. By including both a distribution optimizer 122 and production optimizer 124 configured to use different optimization methods, embodiments of the invention may identify higher-quality solutions in a shorter time than alternative systems.

Figure 5:
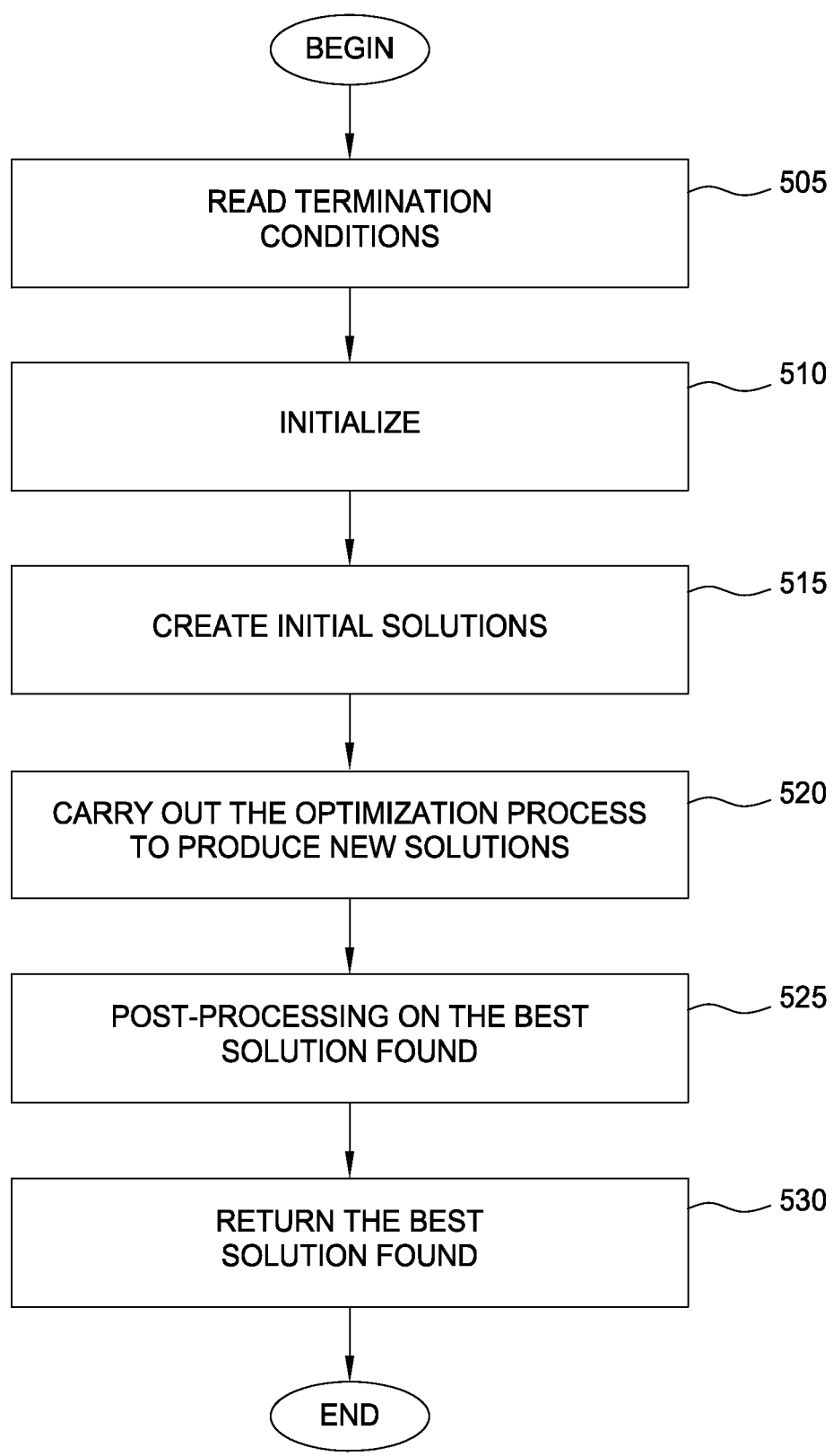
FIGS. 5-6 illustrate the operations of a production optimizer, according to one embodiment of the invention.
Figure 6:
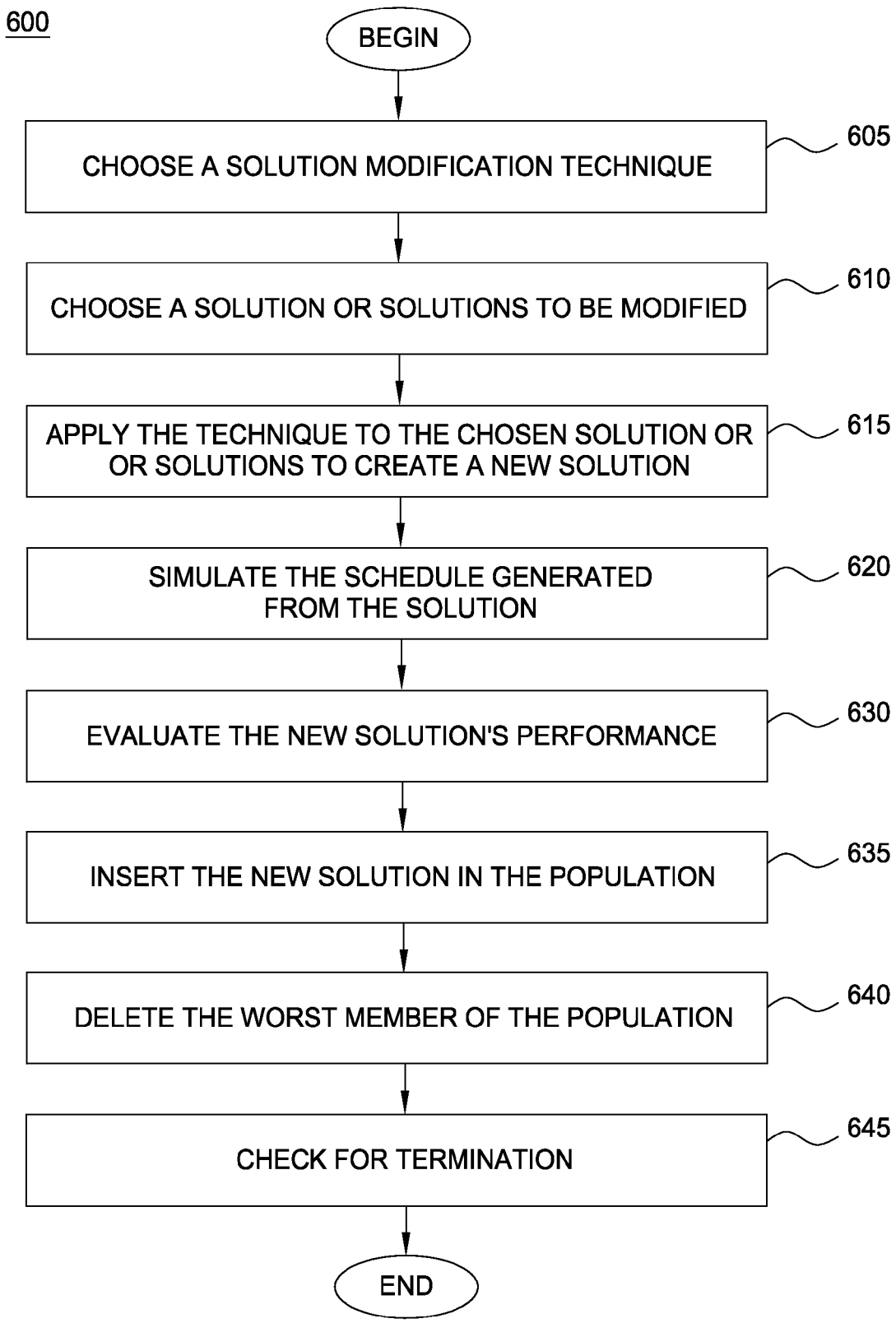
Figure 7:
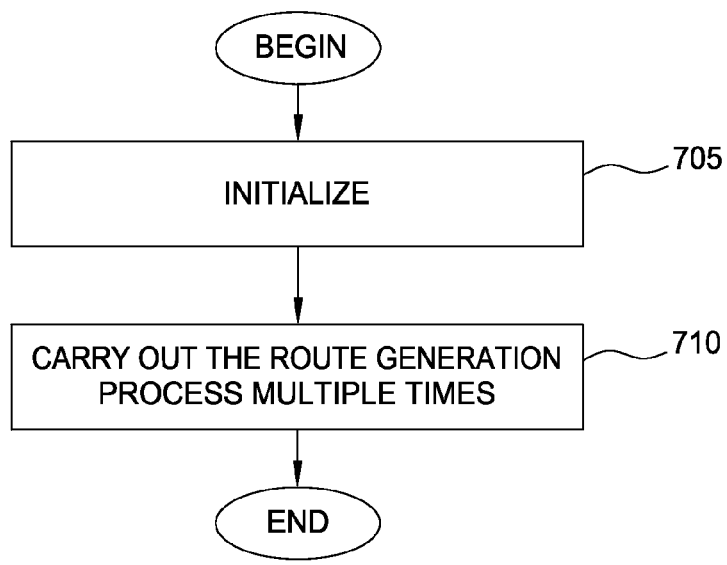
FIGS. 7-9 illustrate the operations of a distribution optimizer, according to one embodiment of the invention.
Figure 8:
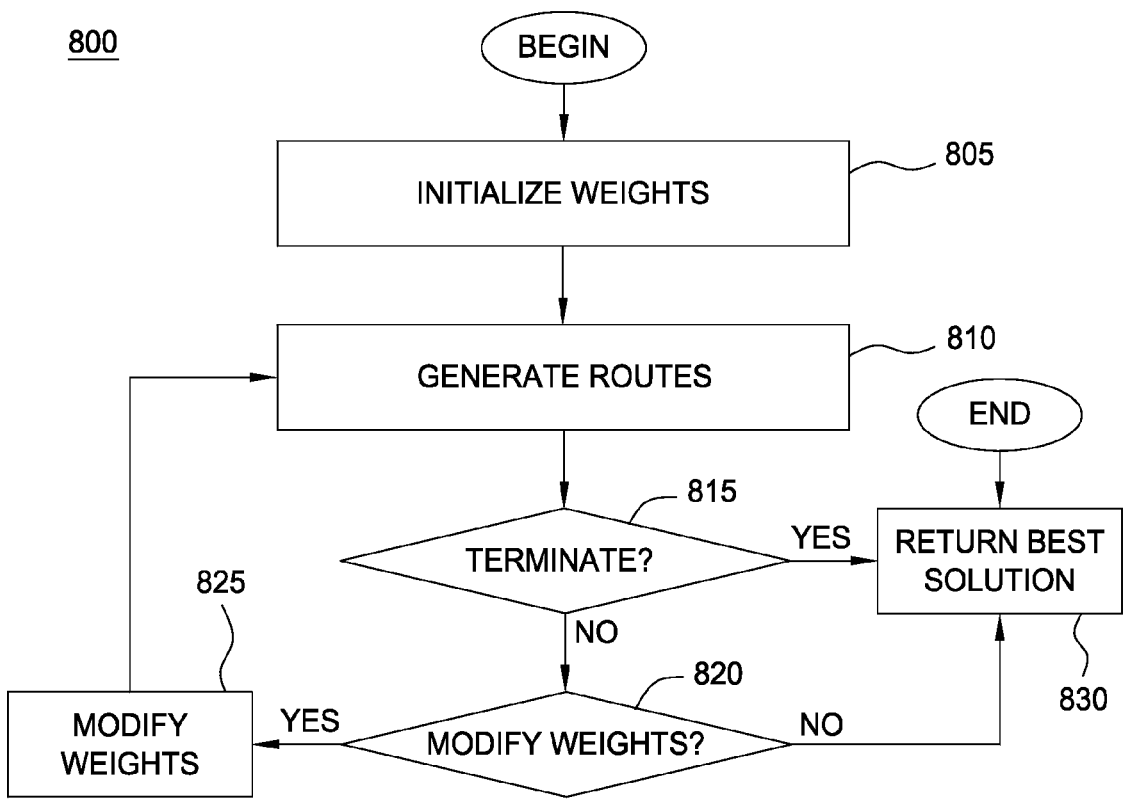

Examples of optimization techniques that optimization module 120 may perform include ant colony optimizers, genetic algorithms, domain-specific heuristics, and mathematical/numerical techniques (e.g., linear programming), and the like. In a particular embodiment, the production optimizer 124 may optimize the production of commodity materials using a genetic algorithm while the distribution optimizer 122 may optimize the distribution of these materials using an ant colony technique. FIGS. 5-6, described below, provide an example of a genetic algorithm optimization technique that may be used by the production optimizer 124, and FIGS. 7-8 provide an example of an ant-colony optimization technique that may be used by the distribution optimizer 122.

Output modules 130 may be configured to generate output data organizing and presenting the results of an optimization run. For example, when the optimization module 120 completes an optimization run, output module 130 may be configured to generate a variety of reports that describe the best solution found, potential data problems, and a breakdown of costs related to the best solution found. Operation control center 135 may use these reports to implement the solution generated by optimization module 120. Similarly, a strategy analyst 140, may analyze reports generated by output module 130 related to a what-if scenario 110. In one embodiment, output module may be configured to generate reports in an XML format.

Figure 2:
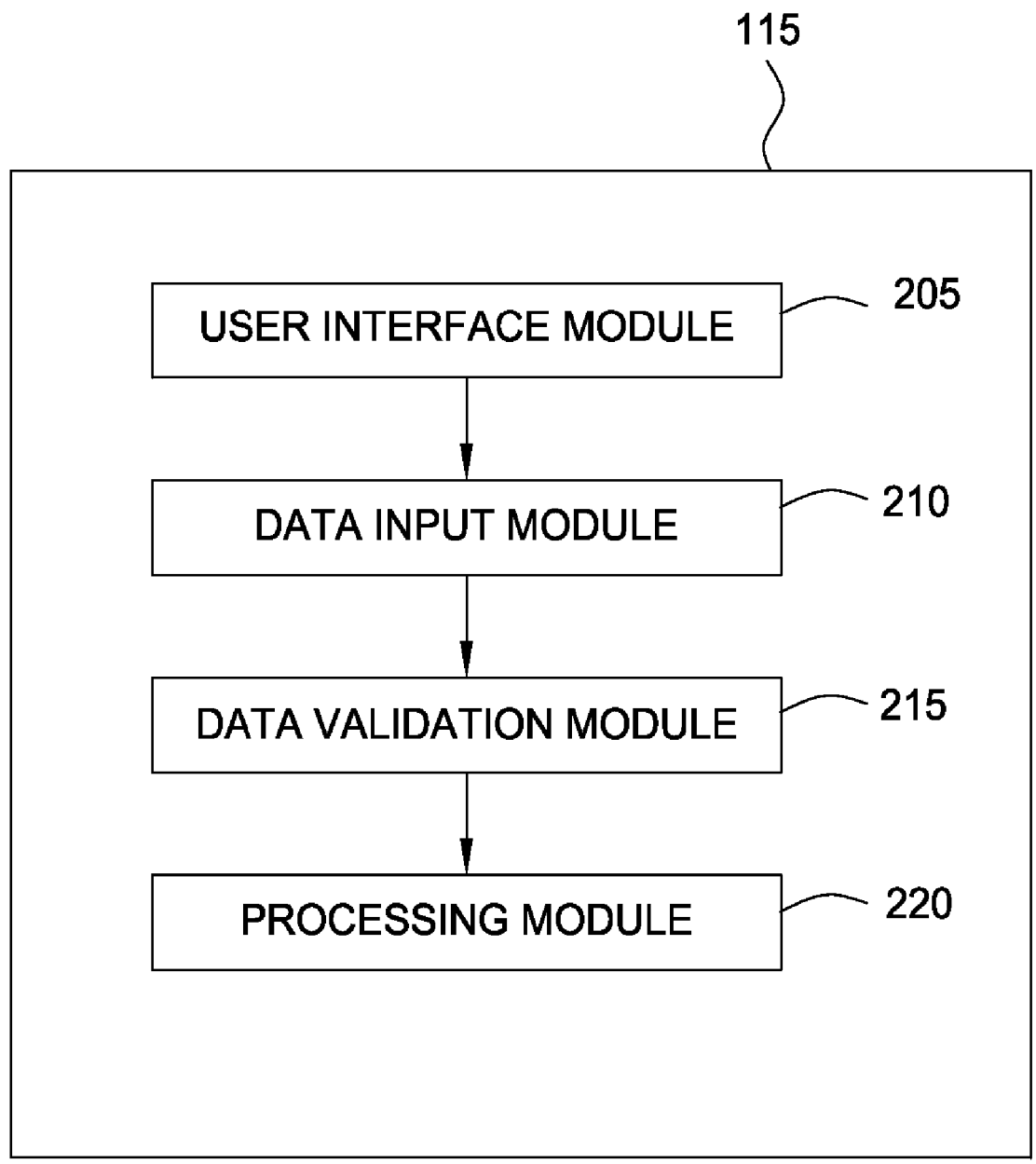
FIG. 2 further illustrates components of the supply chain optimization system of FIG. 1, according to one embodiment of the invention.

FIG. 2 further illustrates components of the supply chain optimization system 100 of FIG. 1, according to one embodiment of the invention. As shown, FIG. 2 illustrates an embodiment of input module 115 that includes a user interface module 205, a data input module 210, a data validation module 215, and data processing module 220. User interface module 205 may allow a user to interact with the optimization system 100. For example, user interface module 205 may provide a graphical user interface that allows graphical editing of the input files describing a production and distribution scenario to be optimized, parameters associated with such a scenario, and may allow users to view results of an optimization run generated by output module 130. Additionally, the user interface module 205 may allow users to perform a variety of functions such as initiating an optimization run, displaying results of an ongoing or completed optimization run, and interrupting an optimization run in progress.

In one embodiment, data validation module 215 may be configured to validate the input data generated by input modules 210. For example, data validation modules 215 may validate whether XML documents describing a what-if scenario 110 are well formed. If an input data file fails to conform to an XML grammar used by the optimization system 100, the user interface module 205 may be configured to provide users with an indication of the actual problem was identified.

Before beginning an optimization run, preprocessing module 220 may be configured to perform any preliminary computations in order to increase the efficiency of the optimization process. For example, in one embodiment, preprocessing module 220 may be configured to generate a demand forecast for installations to which materials may be delivered. In other words, preprocessing module 220 may create forecasts of the requirements of consumers of the commodity materials generated by a production facility. In such a case, the preprocessing module 220 may be configured to calculate an average daily consumption rate of a commodity material by an installation and use these rates during optimization run. In a particular embodiment, the daily consumption rate for an installation to which materials are delivered may be computed from the input demand forecasts for each installation by subtracting a forecast tank level on the final day of the scheduling period from the forecast tank level on the first day of the scheduling period and dividing this quantity by the number of days in the scheduling period.

Figure 3:
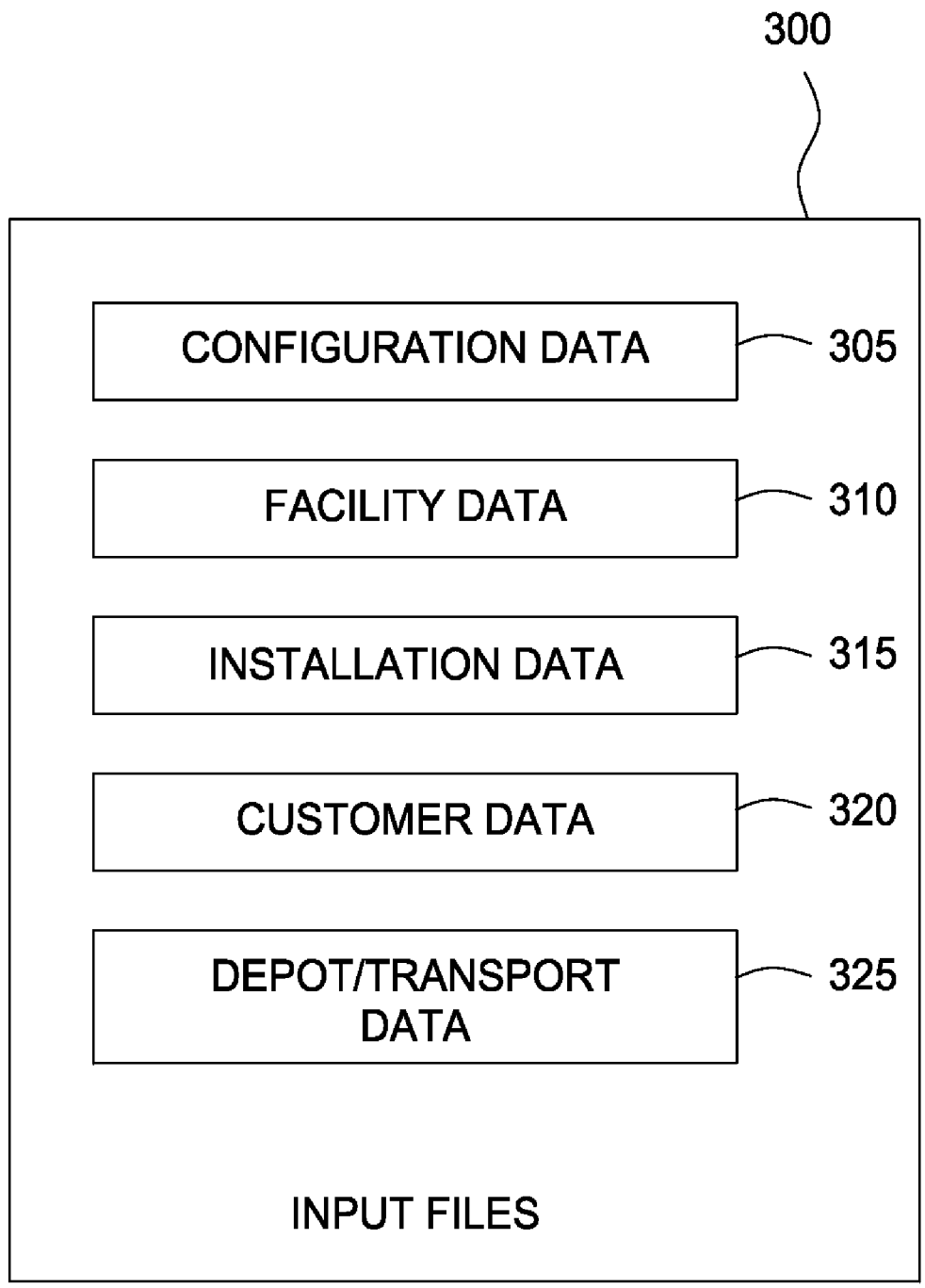
FIG. 3 illustrates a set of input files used by the supply chain optimization system of FIG. 1, according to one embodiment of the invention.

FIG. 3 illustrates a set of input files 300, according to one embodiment of the invention. As described above, the input files 300 may describe information related to production facilities, production levels, demand forecasts, current production costs, client sites, client requirements, distribution facilities, and distribution costs. Further, as stated, input files may be generated in an XML format. As shown, input files 300 may include configuration data 305 that provides general information about an optimization problem, such as settings for the optimizer, optimization techniques to use, output settings, etc. Facility data 310 may include data related to the production of a commodity material. That is, facility data 310 may describe the production side of an SCM problem. For example, for the production of liquid oxygen and nitrogen, facility data 310 may include storage tank sizes, production plant capacities, production plant locations, current material in inventory, days a plant is required to be shut down or in production, and limits on splits (i.e., the relative production percentage of liquid oxygen to liquid nitrogen at a production plant). More generally, facility data 310 may include any information related to the production of a commodity material in a particular case.

Installation data 315 and customer data 320 may describe information related to the distribution side of a production and distribution optimization problem. For example, installation data may describe tank sizes, current inventory levels, constraints on delivery times, and customer data 320 may also describe delivery requirements, contractual obligations, location data, etc. More generally, installation data 315 and customer data 320 may include any information related to the consumers of a commodity material in a particular case.

Depot and transport data 325 may describe available distribution resources available such as drivers, trucks, trailers, rail cars, pipelines, and any other relevant data related to the transport and delivery of commodity materials in a particular case.

Figure 4:
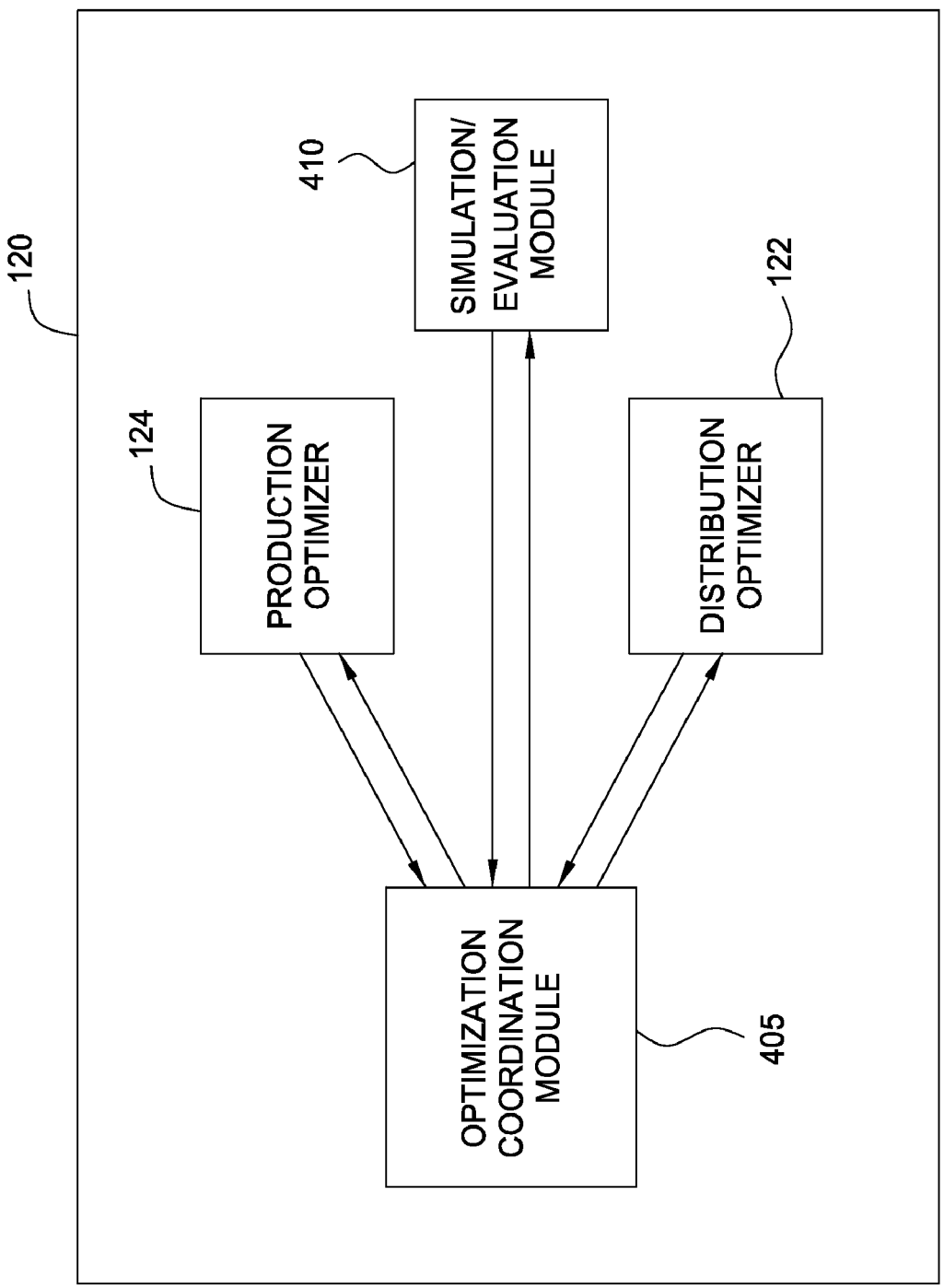
FIG. 4 further illustrates components of the supply chain optimization system of FIG. 1, according to one embodiment of the invention.

FIG. 4 further illustrates components of the supply chain optimization system 100 of FIG. 1, according to one embodiment of the invention. FIG. 4 illustrates an embodiment of optimization module 115 that includes distribution optimizer 122 and production optimizer 124, along with an optimization coordination module 405 and an simulation/evaluation module 410. The arrows are included to illustrate the interaction between the optimization modules during an optimization run.

In one embodiment, optimization coordination module (OCM) 405 coordinates and integrates the functions of the optimizers 122,124, and the evaluation module 410. OCM 405 calls the distribution optimizer 122 and production optimizer 124, and then calls the simulation module 410 with the production and optimization solutions generated by optimizers 122 and 124. OCM returns the result of the simulation module 410 to the production and distribution optimization modules, creating feedback cycles used by optimizers 122 and 124 to optimize an SCM problem. Thus, together, production optimizer 124 and distribution optimizer 122 cooperate to optimize both the production side and the distribution side of an SCM problem.

Figure 9:
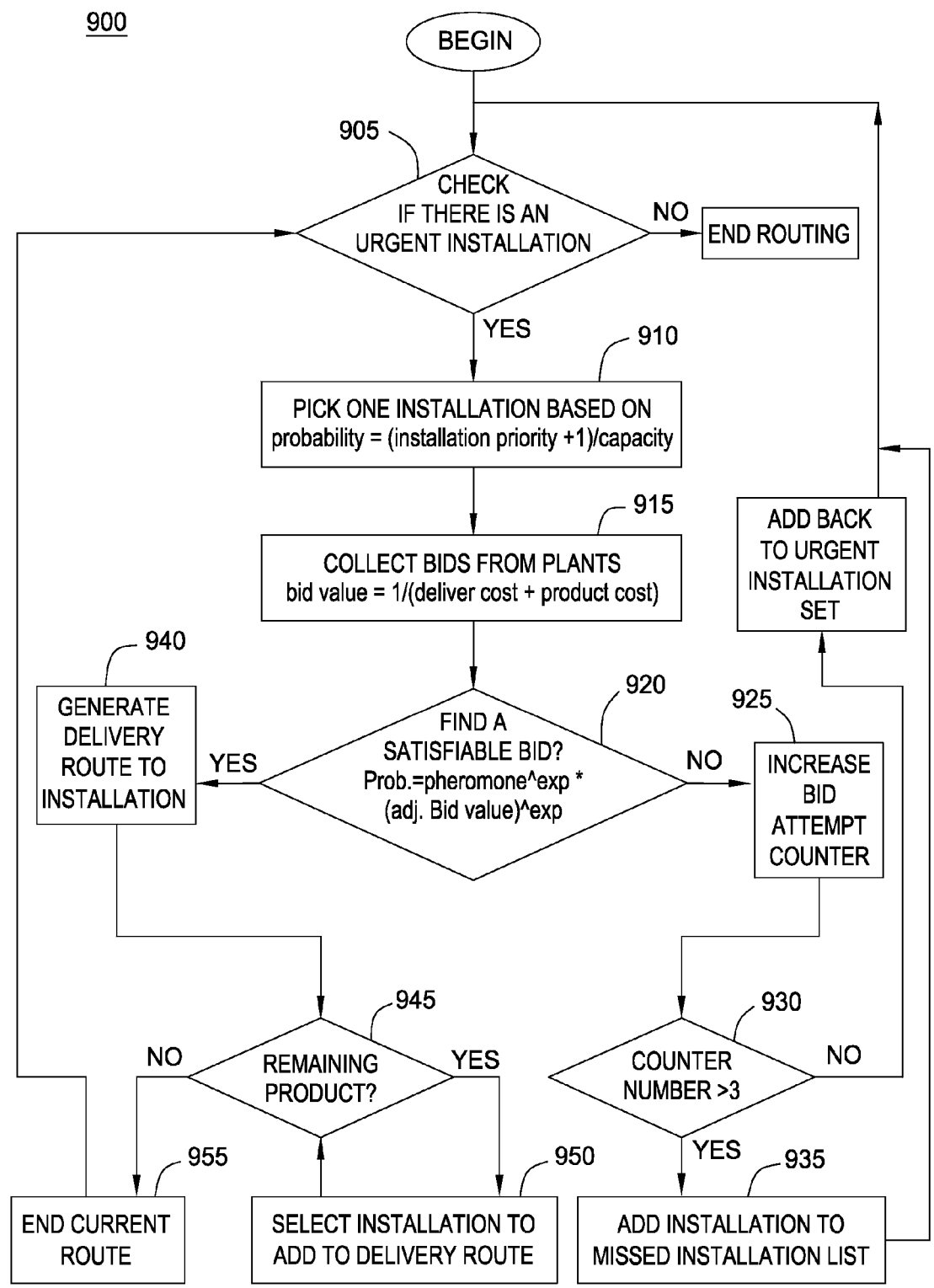

The distribution optimizer 122 may be configured to search for high-quality, feasible solutions to the problem of distributing a commodity product that may be produced or obtained from a variety of sources. For example, the distribution optimizer 122 may be configured to search for solutions to the problem of distributing liquid gas to customers. In one embodiment, the distribution optimizer 122 is configured to perform an ant colony optimization algorithm—an optimization technique inspired by the behavior of foraging ants. FIGS. 7-9, discussed below, further illustrate operations of the distribution optimizer 122.

Production optimizer 124 may be configured to search for high-quality, feasible solutions to the production part of the problem read in and processed by the input module 115. In one embodiment, the production optimizer 124 is configured to perform a genetic algorithm—an optimization technique inspired by the process of biological evolution—to optimize the production side of a production and distribution problem.

A genetic algorithm may operate by modifying a collection of seed solutions (referred to as a "population") according to specific mutation rules, to create a new "generation" of solutions from the current "population." Generally, as known to one of ordinary skill in the art, genetic algorithms cause a "population" of solutions to produce better and better solutions by cross-breeding them, mutating them, and giving more child-producing opportunities to the best members of the population than to the worst ones. An objective function is used to evaluative new solutions generated at each generation to determine the "fitness" of new solutions.

This process may be continued through thousands of generations with the aim that the population should "evolve" to contain better solutions over time. A genetic algorithm is an optimization technique that is sometimes characterized as "evolution on a computer."

FIG. 5 illustrates a method 500 for a production optimizer 124 to optimize the production side of an SCM problem, according to one embodiment of the invention. The method 500 begins at step 505 where the production optimizer 124 identifies termination conditions specified by input files 300. If more than one is specified, then an optimization run may be terminated when any one of them is satisfied. In one embodiment, the termination conditions may include: a maximum number of new solutions (or generations), a maximum amount of clock time spent, or finding a solution that exceeds a specified quality (i.e., a high-fitness solution). Additionally, the user interface module 205 may allow user to manually halt an optimization run (e.g., by entering an interrupt command from a keyboard). This is not a condition included in input file 220, but the optimization coordination module 405 may check for this condition periodically during an optimization run.

At step 510, the production optimizer 124 initializes an optimization run. This may include, for example, creating caches, and data structures used by the production optimizer 124, setting initial production levels for production plants, identifying any critical constraints that a solution may need to provide to be feasible, etc. In an embodiment used to optimize the production and distribution of industrial liquids, for example, all production levels of facilities and plants may be set to an initial state using values specified by input files 300. In addition, during initialization, the production optimizer 124 may identify a set of urgent orders—orders for the delivery of product that should be delivered to prevent a client's storage tank from falling below a safety level. In one embodiment, the urgent orders are may be used to help determine the required production levels for each production plant. Additionally, as described below, urgent orders are used by the distribution optimizer 122 to generate a delivery schedule. Of course, for optimizing the production and distribution of other materials, different initialization actions may be performed.

At step 515, the production optimizer 124 creates a set of initial solutions for the genetic algorithm. In other words, the production optimizer 124 creates the initial "population" of solutions for the genetic algorithm to evolve through modification and breeding.

For an SCM problem related to the production and distribution of industrial liquids, each solution may have a structure as shown in Table I:

Table I—Example Production Solution
  Part 1: A list of production levels for each plant, for each day of the optimization period.
  Part 2: A list of splits for each plant, for each day of the optimization period.
  Part 3: A list of bulk transfers between plants, noting the day of each transfer.

The list of production levels for each plant has values for each day that are either equal to zero (representing a plant shutdown), or that fall within minimum and maximum production level for that plant. The list of splits for each plant represents the ratio of total LIN production to total LOX at a plant for the given day. The list of bulk transfers between plants represents physical transfers of product on the dates specified in part 3.

In one embodiment, production optimizer 124 may generate a first group of seed solutions (in the form shown in Table 1) based on smart heuristics. Generally, a heuristic is a rule of thumb that often works well to achieve a desired result, e.g., reducing cost while maintaining a desired level of production. Heuristics are often based on prior experience. An example of a heuristic used in the SCM system includes: "If a first plant has a lower cost of production than a second plant, including transportation costs, and if the first plant has unused capacity, try switching an order from the second plant to the first."

To generate the first group of seed solutions, the production optimizer 124 creates multiple "smart seeds," based on solution generation heuristics similar to those a human might use. For example, the first group of solutions may include a solution with all plants set at maximum production levels, and heuristics may be used to turn down (or off) the production at plants one at a time until the total production falls below required minimums. Another "smart seed" may include a solution with all plants turned off, with heuristics to turn on plants one at a time, until a minimal production level is reached (e.g., turn on the plant with the lowest production cost first, and then the plant with the second lowest production cost, etc.). Another "smart seed" includes a solution plant with production levels set in the middle of the feasible range, so that subsequent solutions "evolved" from this smart seed may move these intermediate production levels either toward the maximum and minimum values. Additionally, the first group may include a group of solutions specified by the input files 300, if any. Doing so allows a user to provide sample solutions to the production optimizer 124 that are different from the smart seeds described above. For example, a production schedule used for the previous day may be useful starting point for optimizing the next day.

In addition to the first group of seed solutions, the production optimizer 510 may also randomly generate a second group of solutions (that satisfy the constraints specified in the input files 300) to create the initial solution population. This population of solutions provides much of the diversity that allows the genetic algorithm to explore a wide variety of solutions during the early generations of the optimization process.

At step 520, the production optimizer 124 generates new solutions. As stated, in one embodiment, the solution search module is configured to produce new solutions by performing a genetic algorithm using the population of initial solutions generated at step 520. Generally, it is contemplated that the genetic algorithm will operate to "evolve" the population of initial solutions over many thousands of generations, generating a new population at each generation. FIG. 6, described below, further illustrates an embodiment of the actions performed as part of step 520. Once step 520 completes, the production optimizer 124 will typically have generated many solutions. At step 525, the best solution currently in the population computed according to the formula described above) is identified and processed.

In one embodiment, the solution identified as the best solution may be passed to additional optimization routines. In an embodiment used to optimize the production and distribution of industrial liquids, for example, the production optimizer 124 may be modify perform a series of quick checks to improve the solution identified at step 525, when possible. Such post processing of the best solution found may include reducing production at plants that have overflow of product, or conversely, increasing production at plants with tank levels are below minimum levels. Additional example includes returning unused bulk transfer amounts. Bulk transferred product that has not been used by the destination plant is returned to the original plant, so the final solution only has the required bulk transfer amount (thus saving the cost of the transfer, lowering the cost of the overall solution).

At step 530, having "evolved" the initial population of solutions over a number of generations, the production optimizer 124 returns the best solution in its population to the coordination module 405.

FIG. 6 illustrates a method 600 for optimizing the production side of an SCM problem, according to one embodiment of the invention. In one embodiment, the method 600 may be performed repeatedly—tens of thousands of times, in a standard optimization run—in order to find a high-quality solution to an SCM problem. During each pass through the method 600, the production optimizer 124 generates at least one new solution from the set of solutions currently in the population. The initial population may be created at part of the method 500, described above.

At step 605, a solution modification technique is selected. In the classical genetic algorithm, solution modification techniques are random in nature—one might randomly modify the production level of a plant by some small amount, for example. Searching for better solutions with random changes is often not as fast or effective as searching with directed heuristics. At the same time, random mutations may identify new high-quality solutions that directed heuristics will overlook. Accordingly, in one embodiment the production optimizer 124 may be configured to select from a number of non-heuristic (i.e., random) and heuristic (i.e., non-random) techniques to modify a solution, including the following:

Random Change: This modification technique generates a random mutation to one parameter in a solution.

Shift Production: This modification technique moves production from a plant where it is expensive to a plant where it is cheaper. The modification involves increasing production at the less expensive plant and decreasing production at the more expensive plant. The shift production modifier takes into account current production prices and the effects of the shift on both plants involved. If this information were not taken into account when generating candidates for shifting production, then the modifier might shift production from inexpensive production facilities to more expensive ones—a shift highly likely to increase overall production costs.

Reduce Production: This modification technique looks for plants that are potentially over-producing product, selects one such plant through a probabilistic decision process, and reduces that plant's production by a probabilistic amount. (e.g., plants with more expensive production costs are more likely to have production reduced than ones with less expensive production costs).

Change a Split: This modification technique looks for a solution and where a split could be improved for some plant. It changes the split for that plant. This modification technique is useful in an embodiment used to optimize the production and distribution of industrial liquids where a plant may split production capacity between different materials.

Change Production Level: This modification technique looks for a solution where a production level might be changed in order to improve the evaluation of the solution.

Shut down a Production plant. This modification technique looks for solutions that include plants that might profitably be shut down on and probabilistically selects one to shut down. It uses some of the heuristics that a human production expert would use to decide which plants are candidates to be shut down (e.g., a plant with more expensive production costs is more likely to be shut down than one with less expensive production costs).

Turn on plant. This modification technique looks for solutions that include inactive plants that might profitably be turned on. It probabilistically selects one and turns it on to create a new solution. It uses some of the reasoning that a human production expert would use to decide which plants are candidates to be turned on (e.g., a plant with more expensive production costs is less likely to be turned on than one with less expensive production costs).

Add bulk transfer. This modification technique examines the schedule produced by the solution and determines where the addition of a bulk transfer might improve the evaluation of that solution. The heuristic will not introduce a bulk transfer that increases the overall production cost.

Delete Bulk Transfer. This modification technique examines the schedule produced by the solution and determines where the deletion of a bulk transfer might improve the evaluation of that solution. The heuristic will not delete a bulk transfer if the deletion increases the overall production cost.

The effect of having a number of intelligent heuristics available to modify solutions currently in the population is that any of these techniques has a chance of being selected in any pass through the method 600, and so there is no reliance on a single technique. Instead, there is a population of solutions, any of which can have any modification technique applied in an attempt to improve it. By configuring the production optimizer 124 to consider hundreds of thousands of these applications, coupled with the inclusion of expert human heuristics in the set of modification techniques that may be applied, a powerful search of the space of possible solutions typically occurs during an optimization run. Thus, a optimization run is likely to convergence on a high-performance solutions to the production optimization problem.

In one embodiment, any of these (or other) techniques may be selected during a pass through this cycle of optimization. Additionally, modification techniques may be selected probabilistically using default probabilities or using probabilities specified in input files 220. Thus, although any modification technique has a chance of being chosen, some may have higher probabilities than others. Setting the probabilities is a matter of experiment and analysis of the types of solutions the optimizer produces for a given pipeline.

At step 610, one or more solutions from the current population of solutions are selected for modification according to the modification technique selected at step 605. Once a modification technique has been selected, whether one or two solutions are required as inputs is determined. Most of the modification techniques described above require only one, but the cross-breeding modification, for example, requires two.

In one embodiment, solutions are chosen from the general population of solutions using a technique sometimes called a ranked roulette wheel technique. The technique is described as "ranked" because it sorts the solutions in the population of solutions into a list, ordered from best solution to worst. It then assigns a weight to each solution in the list. These weights decrease linearly. For example, with a decrease rate of 10 and a start weight of 100, the first 12 members of the population would have weights of 100, 90, 80, 70, 60, 50, 40, 30, 20, 10, 1, 0.5, . . . . These weights are used to bias the selection process so that the best individuals are more likely to be chosen than the worst ones. The metaphor is one of a roulette wheel with a slot for each member of the population. The slots are not of equal size, however. Each solution's slot is proportional to its weight, calculated as above. When the roulette wheel is set up in this way, a computerized ball is spun, and the individual in whose slot the ball lands is chosen. The best individual in the population, with a weight and slot size of 100, is 100 times more likely to be chosen when a solution is required than the worst individual, with a weight and slot size of 1.

At step 615, the selected solution modification technique is used to create a new solution. That is the modification technique is used to generate the new solution from the original solution. Some of the modifications may be very small—change the production level a bit at one plant, for example. Some may be quite significant—shut down a plant for several days, for example.

At step, 620, the schedule generated from the new solution may be simulated by simulation module 410. Generally, a production solution generated by the production optimizer 124 is transformed into a schedule that also involves a distribution schedule of the commodity product produced. At step 625, the quality (or fitness) of the simulated schedule is evaluated. For example, the simulation module 410 may be configured to compute the total cost of production and distribution of product in the schedule. A detailed example of a fitness equation used to evaluate a combined production/distribution solution is described below for an embodiment of the invention related to the production and distribution of industrial liquids. At step 630, the new solution may be inserted into the population. In one embodiment, the production optimizer keeps a ranked order of the solutions in the population, ordered according to the fitness of each solution. Accordingly, the new solution generated in a pass through the method 600 will be placed in the population according to its fitness score.

At step 630, the worst (i.e., least fit) member of the population is removed from the population. Thus, the population size may remain constant during the optimization process. At step 635, the production optimizer 124 determines whether any termination conditions are satisfied. If so, the optimization process terminates and control returns to step 525 of the method 500. Otherwise, the method 600 is repeated to produce another new solution (i.e., the population moves through another generation).

FIGS. 7-9 illustrate the operations of a distribution optimizer 124, according to one embodiment of the invention. As stated above, in one embodiment, the distribution optimization 124 may be configured to use an ant colony optimization technique.

Ant colony optimizers are inspired by the natural processes by which foraging ants find food, attract other ants to the food source, shorten paths to reach the food from the nest, and cease traveling on those paths when the food source is exhausted. When searching for food, ants initially wander randomly, and upon finding food return to their colony while laying down pheromone trails. When an ant encounters an existing pheromone trail, it is unlikely to continue traveling at random, but to instead follow the trail, returning and reinforcing the trail if it eventually finds food. The pheromone trails evaporate over time, reducing its attractive strength. The more time it takes for an ant to travel down the path and back again, the more time the pheromones have to evaporate. In contrast, a short path is traversed more quickly, and thus the pheromone density remains high. The result is that when one ant finds a good (i.e., short) path from the colony to a food source, other ants are more likely to follow that path, and positive feedback eventually leaves all the ants following a single path. An ant colony optimizer uses "simulated ants" walking around the graph representing the problem to solve to arrive at an optimized solution.

FIG. 7 illustrates a method 700 for the distribution optimizer 122 to perform an ant colony optimization technique, according to one embodiment of the invention. At step 705, the distribution optimizer 122 may be configured to initialize an ant-colony to search for distribution solutions; relative to a production solution generated using the production optimizer 124. In one embodiment, distribution optimizer 122 may be configured initialize the optimization process by creating a vector of weights to represent each plant and a vector for each installation. These weights are used to represent the pheromone levels that are characteristic of ant systems. They bias the construction of routes from one installation to another, and they bias the degree to which a bid from a plant for providing product to an installation will be chosen as the winning bid (plant bids are described in greater detail in conjunction with FIG. 9). Table II shows an example of each of these two vectors.

TABLE II

Example Pheromone Weighted Vectors

| | |
|---|---|
| Plant Weight Vector | <5, 0.5, 2.6, 4.3, .9> |
| Installation Vector | <1.2, 3.4, 5, 1, 0, 0, 0> |

The first vector is an example of a plant vector. It shows how important the distribution optimizer 122 believes it is to ship to different installations from the plant that this vector is associated with. In the example, the vector weights shows that this plant has a preference for shipping product to the first and fourth installations in the list and has a preference to not ship the second and filth installations in the list. The second vector is an example of an installation vector. This vector shows how beneficial the distribution optimizer 122 believes it is to proceed from this installation to other neighboring installations when a delivery to this installation involves less than a truckload of product. In the example vector of table to, the distribution optimizer 122 prefers a delivery to the third installation. At the same time, the vector prohibits a delivery to the fifth, sixth, or seventh neighboring installation. Stated broadly, the distribution optimizer 122 operates by modifying the weights in these vectors to generate a set of delivery routes, based bids for production delivery made by production plants.

Returning to the method 700 illustrated in FIG. 7, once the distribution optimizer 122 is initialized with a particular production solution at step 710, the distribution optimizer 122 may be configured to perform a route generation process multiple times until a termination condition is met.

FIG. 8 illustrates a method 800 showing the operations of the distribution optimizer 122, according to one embodiment of the invention. In this example, the distribution optimizer 122 is configured to optimize the distribution of industrial liquids that may be generated and supplied from a variety of production points. The method 800 beings at step 805 where the weights for the plant weight vectors and installation vectors are initialed. For example, the weight vectors may be initialized to a set of initial values, with some bias introduced so that plants that are physically closer to a bidding plant have higher weights than those of plants that are far away. In addition, constraints such as days of the week or times of day that an installation may receive a delivery are read in from input files 300. At step 810, the distribution optimizer 122 generates routes based on the current vectors and production facilities. FIG. 9, described below illustrates an example of the route generation process that may be performed as part of step 805.

After generating a delivery schedule, the distribution optimizer 122 may be configured to determine whether it should terminate the optimization run being performed (step 815). In one embodiment, termination conditions are read in during the initialization phase and are passed to the distribution optimizer 122 by the optimization coordination module 405. For each solution generated by the genetic algorithm, the distribution optimizer 122 may be configured to produce a fixed number of routes and return the best one. For example, the distribution optimizer 122 may be configured to generate three delivery schedules and return the best one. However, the number of schedules returned may be configured as part of an optimization run, based on, among other things, the optimization problem being solved and the time available to perform an optimization run. Once the desired number of routes has been generated the algorithm returns its best solution to the optimization coordination module 405.

At step 810, the distribution optimizer 122 determines whether to modify the weights in the vectors of weights in the plant weight vectors. In one embodiment, the distribution optimizer 122 modifies weights if it has just produced a solution that is better than any solution previously produced. To modify the weights (step 825), the distribution optimizer may be configured to first reduce every weight in every weight vector by an amount specified in input files 300. The distribution optimizer 122 sums the weight reductions that have occurred as a result of this reduction. It then distributes those weights to the components of the best solution found thus far (reinforcing the "pheromone trail" of the best solution). In other words, the weights may be modified to gradually cause weights on ineffective solutions to die out, while gradually strengthening the weights on the effective solutions. The loop of steps 815-825 may be repeated until termination conditions are met (step 815) and the best solution identified by the distribution optimizer 122 is returned (step 830).

FIG. 9 illustrates a method 900 for the distribution optimizer to generate a delivery schedule using an ant colony optimization technique, according to one embodiment of the invention. Illustratively, the method 900 shows the generation and optimization of delivery routes for delivering industrial liquids to a set of installations. Accordingly, the steps illustrated in method 900 are tailored to scheduling the distribution and delivery this type of commodity product. Those skilled in the art will recognize; however, that embodiments of the invention may be adapted to generate and optimize a delivery schedule for a variety of materials. The method 900 begins at step 905 where the distribution optimizer 122 determines whether there is an urgent installation. That is, the distribution optimizer 122 determines whether there are any more installations for which a delivery route needs to be generated. In the case of industrial liquids, for example, a delivery may not be necessary until the forecasted volume of liquid in a tank at an installation falls below a certain level. If not, the algorithm completes—it has found all the routes that it can on this round of routing.

If there is an urgent installation, then at step 910 the distribution optimizer selects an installation that needs a delivery scheduled. Typically, a delivery schedule may provide a source (plant of production), a destination (an installation), a delivery amount, a time of delivery, and a delivery method (e.g., truck, rail car, pipeline). However, the particular elements of a delivery may vary depending on the SCM problem being optimized.

In different embodiments, a variety of techniques may be used to select from a set of installations. For example, one method is the roulette wheel procedure. Roulette wheel procedures are described in the genetic algorithm discussion, above. Using this method, the size of each installation's slot on the roulette wheel is equal to (installation priority+1)/capacity. When the roulette wheel procedure is used, higher-priority installations are more likely to have a delivery scheduled before lower-priority installations. At the same time, the lower the capacity of an installation, the higher its probability of being selected. A second procedure is a greedy procedure that chooses whatever installation has the highest value of (installation priority+1)/capacity. In other words, the greedy procedure selects the installation with the highest probability of being selected by the roulette wheel process. Another possibility includes an equally random procedure, where the different installations each have an equal probability.

At step 915, each plant generates a bid to serve the installation selected at step 910. In one embodiment, a plant bids on the delivery by calculating (1/(delivery cost+production cost)). Thus, plants with lower total delivery and production costs will generate higher bids than plants with higher total delivery and production costs. If a plant has insufficient inventory to fill the order, it does not submit a bid. At step 920, the distribution optimizer 122 may determine whether at least one bid in the set of bids made by the plants, then a bid is chosen and the algorithm proceeds to routing. In one embodiment, an accepted bid may be selected using one of three procedures.

The most often used is the roulette wheel procedure. Roulette wheel procedures are described in the genetic algorithm discussion above. In one embodiment, the slots of roulette wheel may be determined using a ranking procedure that ranks the quality of the delivery route that occurs from using the plant making the bid to the installation. For example, the size of each bid's slot in the roulette wheel may be equal to the "pheromone weight" in the weight vector representing the trail from the plant making the bid to the installation (raised to an exponential power), plus the adjusted bid value raised to an exponential power. In other words, the probability of the bid being selected is directly proportional to the pheromone weight of a given trail. In one embodiment, the exponents in this equation are read in from input files, and may have a default value of 2.0. Varying the exponent may increase or decrease the strength of the "pheromones trails" left by other routes. A second, "greedy" procedure selects the bid that has the highest value probability calculated using in the roulette wheel procedure. In a third possible procedure, a bid may be randomly selected from different bids. In one embodiment, when the distribution optimizer 122 generates routes, it generates one set of routes using the greedy procedure, one using the random procedure, and additional routes using the roulette wheel procedure.

At step 925, if there are no bids to serve the installation selected at step 910, then a bid attempt counter is incremented to reflect the number of times the distribution optimizer 122 has tried to find bids for this installation. In one embodiment, an installation has three chances at receiving a delivery bid, and after that, the installation is placed on a missed installations list (steps 930 and 935). If that number is less than 3, the installation is placed back on the urgent installations list, and may be selected again at another iteration of step 905. It may appear that if there are currently no bids for one installation, then there is no way that bids could appear when the installation is processed again. However, if the installation receives product as a result of being a secondary delivery to a delivery scheduled for another installation, then the one installation may require less product and a bid may become possible.

At step 940, if a bid is selected at step 920, then the distribution optimizer 122 creates a route from the source plant with the accepted bid to the installation and notes the distance and time of the route. In one embodiment, the route travel times may be determined using a fixed rate of travel, typically a historically average rate, input as part of input files 300. However, other techniques may be used.

At step 945, if the size of the delivery to the installation is below the maximum delivery capacity, then the distribution optimizer 122 may be configured to identify whether any nearby customer sites may be added to the route currently being generated. For example, for the distribution of industrial liquids, if the capacity of the client tank being delivered to holds less than a full truckload of material, then the distribution optimizer 122 determines whether any other potential delivery sites are within certain radius of the installation. This radius may be provided as parameter included in input files 300. If there is another client site within this radius that can take the remainder of the product in the truck, even if that site is not below trigger level to place it on the urgent installations list, then that site is inserted into the route in the most economical way that respects delivery time constraints (step 950). If multiple sites can accept a non-urgent delivery, the strength of the connection (i.e., the pheromone trails contained in the installation vector) between the current site and the potential sites determines which site is visited next. If there is remaining product in the truck after this procedure, steps 945 and 950 may be repeated, until the truck is empty or there are no more candidate delivery sites to consider at which point the distribution optimizer 122 ends generating the current route (step 955).

As described above, the production optimizer may be configured to optimize a production schedule and the distribution optimizer may be configured to determine an optimal distribution schedule, based on client requirements and a particular production solution. Simulation module 410 may be configured to compute the effects of a schedule, given as inputs the production schedule produced by the production optimizer 124 and the distribution schedule produced by the distribution optimizer 122. Additionally, in one embodiment, the schedule simulation module 410 may be configured to "repair" these schedules during simulation if they result in unfilled orders that can be filled by increasing production levels at a particular plant. In other words, if a particular production and distribution schedules proves to be close to satisfying all orders, the solution may be modified by identifying the best plant to deliver to an installation and raising production at that plant (if possible) to fill unfilled orders.

The simulation module 410 may be further configured to compute an evaluation score (i.e., a fitness) of a production/distribution solution. The following discussion provides an example of calculating an evaluation score of a production/distribution solution for an embodiment used to optimize the production and distribution of industrial liquids. Of course, for SCM problems involving other commodity materials, the method of calculating a fitness score may vary. First, the simulation module 410 computes the cost of executing the solution's strategy. An example of a cost function appropriate for an SCM problem involving industrial liquids is:

$$\text{cost} = \text{deliverycost} + \text{totalProductionCost} + \text{bulkTransferCost} + \text{redlinePenalty} + \text{missedinstallationPenalty}.$$

This raw score may be used to determine a normalized fitness value between 0.0 and 1.0 by calculating the inverse of the raw "cost" score $$\text{fitness} = 1/(\text{cost})$$

Thus, as the raw cost score increases the fitness of a solution decreases.

In one embodiment, the variables in the cost function may be computed as follows:

$$\text{deliverycost} = \text{total distribution cost} + \text{early delivery penalty (if any)}.$$

That is, the delivery cost may add a penalties for an early delivery (e.g., in order to empty a truck as part of steps 945 and 950 of the method 900) to the total cost of a solution. totalProductioncost may be computed by summing the production cost across all facilities, using their particular energy costs, production costs, and so forth. bulkTransferCost may be computed by summing the total cost of all the bulk transfers in the system. And each bulk transfer cost may be computed as the product of a constant and the number of miles involved in the bulk transfer. The constant may represent the average cost of a bulk transfer during a given period in which the bulk transfer occurs. In one embodiment, some client installations may have a "red line minimum" indicating a minimum amount of material that should always be available at a given installation. The redline penalty may be computed as follows, where the redline violation penalty is a per-unit constant set by the user in input files 300:

redlinePenalty=redlineViolationVolume*RedlineViolationPenalty.

The missed installation penalty is a penalty applied for missing orders. It is computed as follows:

missedinstallationPenalty=urgencyDeltaFactor*
(pwUrgencyCount+urgencycount)*missedinstallationPenalty.

In this equation, the urgencyDeltaFactor is a global constant set by the user. The pwUrgencyCount variable represents the precedence weighted missed urgency count. It is computed in this way for forecast demand:

pwUrgencyCount=safetycount*(dailyContributionFactor(day)+installationPriority)+
unsatisfiedDemandOrderCount*constantFactor, In this equation, safety count is the number of times this installation broke the safety level in the tanks during the scheduling period; the contribution factor is taken from a vector of values greater than or equal to 0.0 that represent the greater importance of near-term days in the scheduling window; the installation priority is a feature of the installation read in during the data input phase; the unsatisfied demand order count is a count of the unsatisfied orders; and the constant factor is the sum of the daily contribution factor for the day in question, a constant representing each demand order's contribution to the sum, and the priority of the installation.

For call in demand (i.e., unscheduled orders) pwUrgencyCount may be computed as:

pwUrgencyCount=unsatisfiedDemandOrderCount*constantFactor.

Finally, the urgencycount variable may be calculated (for either forecast demand or call in demand) as follows:

For forecast demand (i.e., scheduled or anticipated orders):

urgencycount=safetyCount+unsatisfiedDemandOrderCount.

For call in demand:

urgencycount=unsatisfiedDemandOrderCount.

In general, the parameters of the cost function described above tend to favor the following goals, in decreasing order of importance:

meet day 0 and day 1 demand
meet demand order demand
meet the demands of a location with a higher priority
find the lowest cost solution, including penalties.

EXAMPLES

From the user's point of view, embodiments of the invention may be used to perform a variety of different tasks.

First, in general daily operation, described in the preceding section, the optimization system described herein may operate somewhat autonomously. Users may review solutions produced by the system 100, and can examine output data generated by output modules 130 to see whether there have been problems with the data or with the solutions. From time to time, users may need to modify input files 300 to reflect changes in the plants or changes to the constraints used in the evaluation process.

Another use of the system 100 includes the ability to perform a variety perform a what-if analysis. In such a case, the system 100 may provide valuable data bearing on strategic decisions, e.g., whether to approve an upgrade to existing equipment. The user modifies the input files 300 in order to reflect the equipment change and any related changes to the production plants (e.g., increased/decreased production capacity or production costs). Another example includes modifying the requirements specified by input data 300 to reflect possible changes in client usage patterns (e.g., a sudden increase/decrease in consumption of a commodity product). Still another example, users may modify input files 300 to describe changes to the current state of a production plant. The difference in operating cost between an optimization run using the modified input files 300 and current actual operating costs may provide a strong indication to the user of the potential benefits or costs of making the equipment upgrade.

Another use of the system 100 includes planning for change in client usage patterns. For example, a user generates multiple optimization problems, reflecting the points at which changes may occur in usage patterns. The user then analyzes the solutions produced by the system to determine whether those solutions represent a reasonable transition path in liquid gas operations. If not, the user may impose additional constraints on difficult intermediate solutions that cause them to blend with the solutions adjacent to them in time. Thus, embodiments of the invention may assist a commodity producer in transitioning from one general operational state to another operational state.

It is understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method of optimizing a supply chain, comprising:
  a) generating, by operation of one or more processors executing a first application, an optimized production solution for the supply chain by using a genetic algorithm optimization technique to optimize a population of seed solutions, wherein the optimized production solution specifies at least, for each day of an optimization period: (i) a production level for each of one or more commodity products produced at each of one or more production plants and (ii) a production split between the commodity products for each of the one or more production plants; and
  b) generating, by operation of one or more processors executing a second application, an optimized distribution solution for distributing the commodity products produced according to the optimized production solution using an ant colony optimization technique, wherein generating the optimized distribution solution for the optimized production solution using the ant colony optimization technique, comprises:
    (i) initializing a plant weight vector for each of the production plants in the supply chain, wherein components of the plant weight vector indicate preferences for a delivery from the plant represented by the plant weight vector to an installation represented by a vector component, (ii) initializing an installation vector for each delivery location in the supply chain, and wherein components of installation vector indicate a preference for a subsequent delivery from the installation represented by the installation vector to an installation represented by a vector component, and (iii) generating the distribution solution based on a set of weights specified by components of the plant weight vectors and installation vectors, wherein the distribution solution describes one or more delivery routes from a given one of the production plants to at least one delivery location.

2. The computer-implemented method of claim 1, wherein generating an optimized production solution for the supply chain, comprises:

a) reading input data, wherein the input data describes a supply chain problem to be optimized;

b) generating the population of seed solutions, wherein each solution in the population specifies a feasible solution for a supply chain problem to be optimized;

c) evaluating each solution in the population and sorting the solutions in the population according to the evaluation; and d) performing the genetic algorithm optimization technique on the population until a termination condition specified by the input data is satisfied.

3. The computer-implemented method of claim 2, wherein performing the genetic algorithm optimization technique comprises:

a) modifying at least one aspect of at least one of the solutions in the population;

b) evaluating the performance of the modified solution;

c) adding the modified solution to the population; and d) removing a solution from the population with the poorest evaluation, relative to other solutions in the population.

4. The computer-implemented method of claim 3, wherein modifying at least one aspect of at least one of the solution in the population, comprises:

a) selecting a solution modification technique;

b) selecting the at least one solution from the population to modify; and c) modifying the at least one solution, according to the selected solution modification technique.

5. The computer-implemented method of claim 3, wherein the solution modification technique randomly modifies at least one aspect of the at least one solution.

6. The computer-implemented method of claim 3, wherein the solution modification technique modifies the at least one solution according to a heuristic rule.

7. The computer-implemented method of claim 3, wherein the solution modification technique cross-breeds two or more solutions to generate the modified solution.

8. The computer-implemented method of claim 3, wherein modifying at least one aspect of at least one of the solutions in the population comprises probabilistically selecting one or more solutions, wherein a solution with a superior evaluation is more likely to be selected for modification than a solution with an inferior evaluation.

9. The computer-implemented method of claim 1, wherein the population of seed solutions includes a first group of solutions and a second group of solutions, wherein the first group of solutions are generated according to heuristic rules and wherein the second group of solutions are randomly generated.

10. A computer-readable storage medium containing a program which, when executed, performs operations for optimizing a supply chain, comprising:

a) generating an optimized production solution for the supply chain by using a genetic algorithm optimization technique to optimize a population of seed solutions, wherein the optimized production solution specifies at least, for each day of an optimization period: (i) a production level for each of one or more commodity products produced at each of one or more production facilities and (ii) a production split between the commodity products for each of the one or more production faculties; and b) generating an optimized distribution solution for distributing the commodity products produced according to the optimized production solution using an ant colony optimization technique, wherein generating the optimized distribution solution for the optimized production solution using the ant colony optimization technique, comprises:

(i) initializing a plant weight vector for each of the production plants in the supply chain, wherein components of the plant weight vector indicate preferences for a delivery from the plant represented by the plant weight vector to an installation represented by a vector component, (ii) initializing an installation vector for each delivery location in the supply chain, and wherein components of installation vector indicate a preference for a subsequent delivery from the installation represented by the installation vector to an installation represented by a vector component, and (iii) generating the distribution solution based on a set of weights specified by components of the plant weight vectors and installation vectors, wherein the distribution solution describes one or more delivery routes from a given one of the production plants to at least one delivery location.

11. The computer-readable storage medium of claim 10, wherein the operation for generating an optimized production solution for the supply chain comprise:

a) reading input data, wherein the input data describes a supply chain problem to be optimized;

b) generating the population of seed solutions, wherein each solution in the population specifies a feasible solution for a supply chain problem to be optimized;

c) evaluating each solution in the population and sorting the solutions in the population according to the evaluation; and d) performing the genetic algorithm optimization technique on the population until a termination condition specified by the input data is satisfied.

12. The computer-readable storage medium of claim 11, wherein the operations for performing the genetic algorithm optimization technique, comprise:

a) modifying at least one aspect of at least one of the solutions in the population;

b) evaluating the performance of the modified solution;

c) adding the modified solution to the population; and d) removing a solution from the population with the poorest evaluation, relative to other solutions in the population.

13. The computer-readable storage medium of claim 12, wherein the operations for modifying at least one aspect of at least one of the solution in the population, comprise:
   a) selecting a solution modification technique;
   b) selecting the at least one solution from the population to modify; and
   c) modifying the at least one solution, according to the selected solution modification technique.

14. The computer-readable storage medium of claim 12, wherein the solution modification technique randomly modifies at least one aspect of the at least one solution.

15. The computer-readable storage medium of claim 12, wherein the solution modification technique modifies the at least one solution according to a heuristic rule.

16. The computer-readable storage medium of claim 12, wherein the solution modification technique cross-breeds two or more solutions to generate the modified solution.

17. The computer-readable storage medium of claim 12, wherein modifying at least one aspect of at least one of the solutions in the population comprises probabilistically selecting one or more solutions, wherein a solution with a superior evaluation is more likely to be selected for modification than a solution with an inferior evaluation.

18. The computer-readable storage medium of claim 10, wherein the population of seed solutions includes a first group of solutions and a second group of solutions, wherein the first group of solutions are generated according to heuristic rules and wherein the second group of solutions are randomly generated.

19. A computing device used to optimize operations of a supply chain, comprising:
   a) a processor;
   b) a production optimizer which, when executed by the processor, is configured to generate an optimized production solution for the supply chain by using a genetic algorithm optimization technique to optimize a population of seed solutions, wherein the optimized production solution specifies at least, for each day of an optimization period: (i) a production level for each of one or more commodity products produced at each of one or more production facilities and (ii) a production split between the commodity products for each of the one or more production faculties; and
   c) a distribution optimizer which, when executed by the processor, is configured to generate an optimized distribution solution for distributing the commodity products produced according to the optimized production solution using an ant colony optimization technique, wherein generating the optimized distribution solution for the optimized production solution using the ant colony optimization technique, comprises:
      (i) initializing a plant weight vector for each of the production plants in the supply chain, wherein components of the plant weight vector indicate preferences for a delivery from the plant represented by the plant weight vector to an installation represented by a vector component,
      (ii) initializing an installation vector for each delivery location in the supply chain, and wherein components of installation vector indicate a preference for a subsequent delivery from the installation represented by the installation vector to an installation represented by a vector component, and
      (iii) generating the distribution solution based on a set of weights specified by components of the plant weight vectors and installation vectors, wherein the distribution solution describes one or more delivery routes from a given one of the production plants to at least one delivery location.

20. The computing device of claim 19, wherein the production optimizer is configured to generate an optimized production solution for the supply chain by performing the steps of:
   a) reading input data, wherein the input data describes a supply chain problem to be optimized;
   b) generating the population of seed solutions, wherein each solution in the population specifies a feasible solution for a supply chain problem to be optimized;
   c) evaluating each solution in the population and sorting the solutions in the population according to the evaluation; and
   d) performing the genetic algorithm optimization technique on the population until a termination condition specified by the input data is satisfied.

21. The computing device of claim 20, wherein the step of performing the genetic algorithm optimization technique comprises:
   a) modifying at least one aspect of at least one of the solutions in the population;
   b) evaluating the performance of the modified solution;
   c) adding the modified solution to the population; and
   d) removing a solution from the population with the poorest evaluation.

22. The computing device of claim 21, wherein the step of modifying at least one aspect of at least one of the solution in the population, comprises:
   a) selecting a solution modification technique;
   b) selecting the at least one solution from the population to modify; and
   c) modifying the at least one solution, according to the selected solution modification technique.

23. The computing device of claim 21, wherein the solution modification technique randomly modifies at least one aspect of the at least one solution.

24. The computing device of claim 21, wherein the solution modification technique modifies the at least one solution according to a heuristic rule.

25. The computing device of claim 21, wherein the solution modification technique cross-breeds two or more solutions to generate the modified solution.

26. The computing device of claim 21, wherein the step of modifying at least one aspect of at least one of the solutions in the population comprises probabilistically selecting one or more solutions, wherein a solution with a superior evaluation is more likely to be selected for modification than a solution with an inferior evaluation.

27. The computing device of claim 19, wherein the population of seed solutions includes a first group of solutions and a second group of solutions, wherein the first group of solutions are generated according to heuristic rules and wherein the second group of solutions are randomly generated.

* * * * *